United States Patent [19]

Kobluk

[11] Patent Number: 5,397,145
[45] Date of Patent: Mar. 14, 1995

[54] VELOCIPEDE WITH SINGLE FRAME BAR

[76] Inventor: Carlos Kobluk, 202 N. 15th St., Kenilworth, N.J. 07033

[21] Appl. No.: 17,849

[22] Filed: Feb. 16, 1993

[51] Int. Cl.⁶ .......................................... B62K 21/00
[52] U.S. Cl. ................................... 280/240; 280/252; 280/256; 280/288.1
[58] Field of Search ............... 280/210, 234, 240, 252, 280/253, 256, 263, 267, 269, 288.1

[56] References Cited

U.S. PATENT DOCUMENTS

| | | | |
|---|---|---|---|
| 88,894 | 4/1869 | Mott | 280/256 X |
| 358,661 | 3/1907 | Latty et al. | |
| 1,277,161 | 8/1918 | Weber, Jr. | |
| 1,354,141 | 9/1920 | Sleffel | |
| 1,387,535 | 8/1921 | Englund | |
| 4,070,032 | 1/1978 | Cunningham | 280/261 X |
| 4,351,406 | 9/1982 | Lay | 180/65 R |
| 4,456,277 | 6/1984 | Carpenter | 280/269 X |
| 4,618,160 | 10/1986 | McElfresh | 280/261 X |
| 4,993,733 | 2/1991 | Eilers | 280/267 X |
| 5,120,074 | 7/1992 | Herman et al. | 280/220 |
| 5,201,538 | 4/1993 | Mayn | 280/288.1 |
| 5,207,442 | 5/1993 | Gray et al. | 280/253 X |

FOREIGN PATENT DOCUMENTS 1075464 4/1945 France ....................... 280/269
415363 10/1946 Italy .
327620 4/1930 United Kingdom .

Primary Examiner—Richard M. Camby
Assistant Examiner—Victor E. Johnson
Attorney, Agent, or Firm—Norman St. Landau

[57] ABSTRACT

A four wheel velocipede includes a single front to rear frame member connected to front and rear axle assemblies. The steering mechanism is coupled to the front axle assembly by a pipe braced to the frame member. In one embodiment, the frame member is bent over to one side and contains a drive linkage driven by a pedal operated crank assembly connected to a central cantilevered pipe for driving a rear wheel. In a second embodiment, a front wheel drive includes universal joints connecting the front axles to a pedal driven crank for permitting the front wheels to be driven while simultaneously steered. A horizontally extending cross member crank pivots about a vertical axis on the frame member for driving the pedal driven crank via a pair of reach arms connected to the cross member crank.

6 Claims, 5 Drawing Sheets

VELOCIPEDE WITH SINGLE FRAME BAR

This invention relates to velocipedes, and more particularly, to axle and drive constructions employed in such vehicles.

BACKGROUND OF THE INVENTION

Typical prior art constructions using a pair of front wheels and a pair of rear wheels comprise a frame construction using a plurality of beams connecting a front axle assembly to a rear axle assembly. These beams, typically of steel, are relatively heavy; they add considerable weight to the velocipede; and they make it difficult for a small child to operate up hills or to carry in an effort to store the vehicle or during use.

Further, these vehicles also employ exposed moving parts which might tend to injure a small child during operation. The present inventor recognizes a need for a light weight, four wheel velocipede which can be easily used by a small child and also a need for a safe construction for very small children in which exposed moving parts are minimized.

SUMMARY OF THE INVENTION

A velocipede according to the present invention comprises front axle means for rotatably securing first and second front wheels and rear axle means for rotatably securing first and second rear wheels. A frame is included having a front and a rear comprising a single bar and means for connecting the front axle means to the frame front and the rear axle means to the frame rear. Wheel drive means are secured to the frame for rotating at least one of the front and rear wheels. Seat means and means for steering the front wheels by steering the front axle means are secured to the frame.

In accordance with one embodiment of the invention, the front axle construction comprises first and second axles for respectively receiving first and second wheels and crank means comprising a crank shaft having opposing ends defining a shaft axis of rotation and a pair of oppositely extending bends extending from the axis for rotation in response to a foot induced transverse force applied alternatively to the bends. Means are included for coupling the first axle to a first end of the crank shaft and the second axle to an opposing end of the first end, the means for coupling comprising means for providing a pivot axis between each of the first and second front axles and the crank shaft opposing ends. The means for coupling includes means so that the front axles can be used to steer the velocipede.

In another embodiment the rear axle means comprises an axle rotatably secured to the frame for rotation about a rear axis. The crank means comprises a foot operated bent crank shaft having oppositely extending crank arms, each arm lying on an axis spaced from the crank axis. Link means are included having a plurality of pivot connections connecting the crank shaft to the axle for rotating the axle in response to rotation of the crank shaft, the link means being contained in the core of a hollow pipe forming the frame.

BRIEF DESCRIPTION OF THE DRAWING

FIG. 4b is a side sectional elevation view of the assembled joint of FIG. 4a;

DETAILED DESCRIPTION OF THE INVENTION

Figure 1:
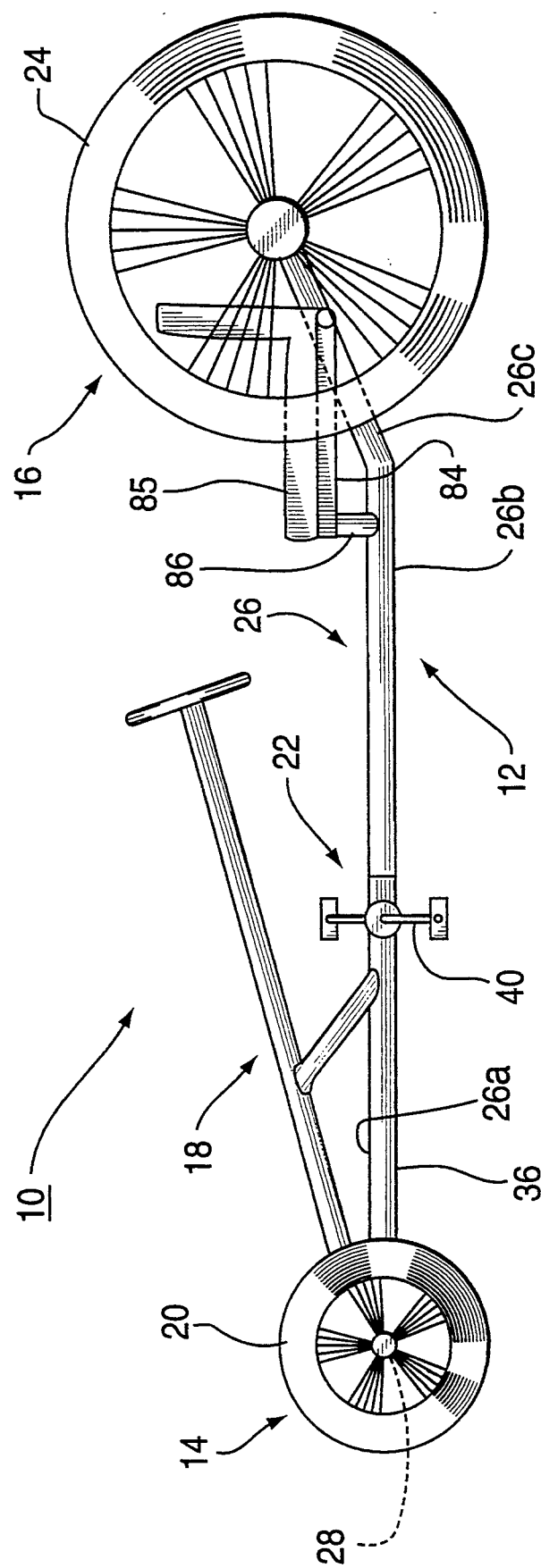
FIG. 1 is a side elevation view of a velocipede according to one embodiment of the present invention.

In the Figures like reference numerals represent like parts throughout.

Figure 2:
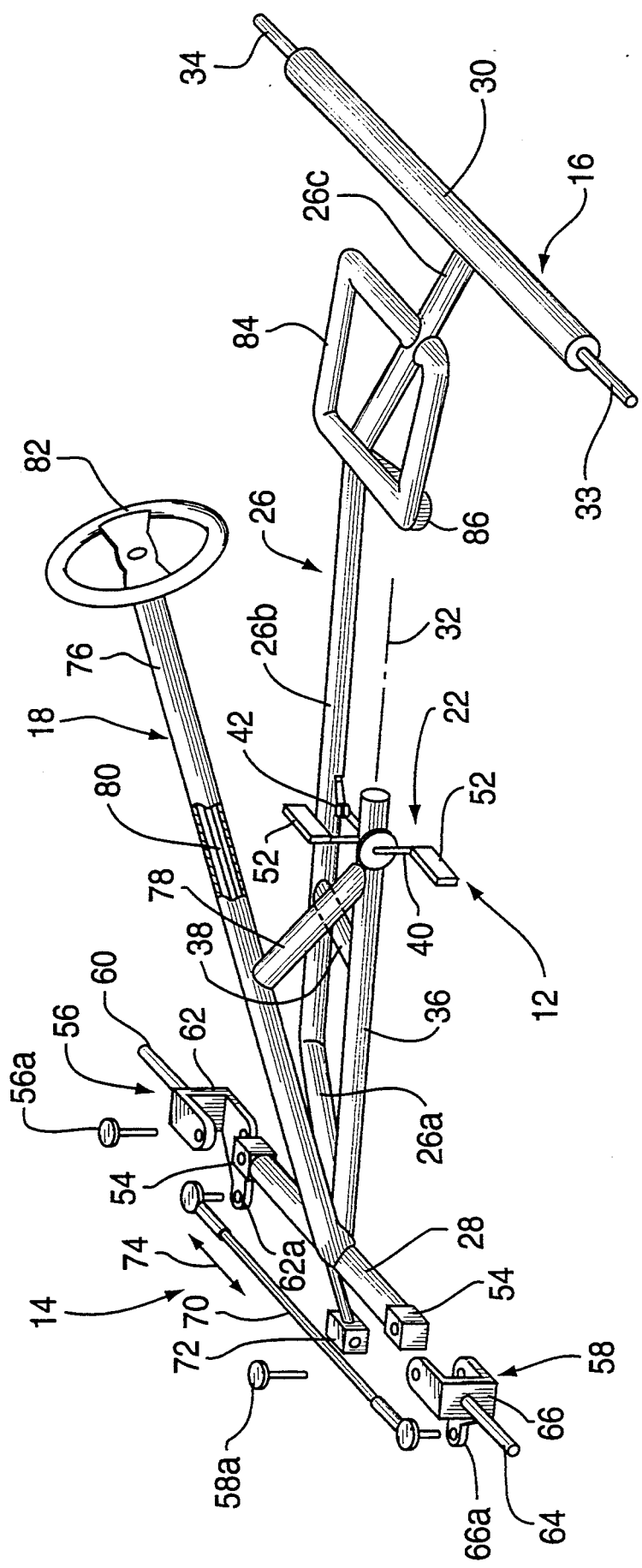
FIG. 2 is an isometric view of the frame construction of the embodiment of FIG. 1.
Figure 3:
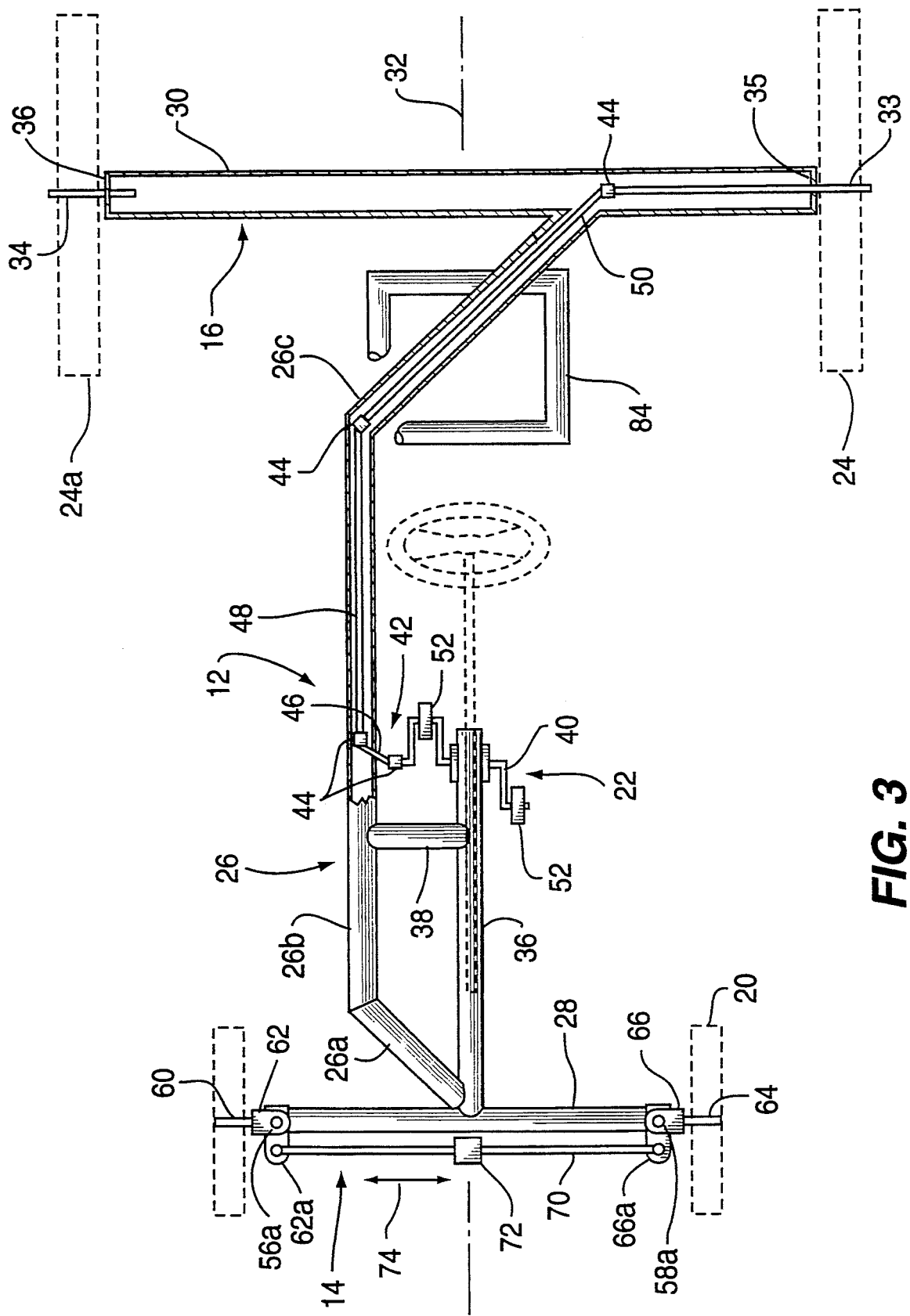
FIG. 3 is a fragmented partially in section plan view of the frame construction of FIG. 2.

Referring to FIGS. 1-3, velocipede 10 comprises a frame 12, a front wheel assembly 14 and a rear wheel assembly 16. A steering wheel assembly 18 is secured to the frame 12 for steering the front wheels 20. A pedal-operated drive 22 operates one rear wheel 24 the other rear wheel 24a rotating in a free wheeling mode at all times.

In FIGS. 2 and 3, the frame 12 comprises a single hollow core pipe 26, preferably of steel or other high strength metals, formed of three sections: a front section 26a, a middle section 26b and a rear section 26c. These sections 26a, 26b and 26c are welded together to form the single pipe 26. The front end of section 26a is welded to a transverse axle support member 28, which preferably is also a hollow metal pipe. The rear section 26c is welded to a rear transverse axle support member 30, which member 30 is also made of a hollow metal pipe.

The velocipede 10 has a longitudinal central axis 32 normal to support members 28 and 30 which are each straight pipes. Section 26a is secured to the front support member 28 at an acute angle so that the central pipe section 26b, which extends for most of the distance between the support members 28 and 30, is spaced from the central axis 32, as best seen in FIG. 3. The central section 26b also extends parallel to the axis 32. The front and central respective sections 26a and 26b lie in the same plane as the front axle support member 28, as seen in FIG. 1. The rear section 26c is also at an acute angle to the rear support member 30. However, the rear section 26c extends out of the plane of the sections 26a and 26b upwardly, as shown in FIG. 1, to accommodate the rear wheels 24 and 24a. The rear wheels have larger diameters than the front wheels 20 and thus have axles 33 and 34 higher than the front wheel axles. In this embodiment, the rear support member 30 is in a plane above that of the remainder of the frame 12 to allow for the higher rear axles 33 and 34.

An end plate 36, (FIG. 3) is secured to one end of the rear axle support member 30. The axle 34 is mounted to the end plate 36. The axle 34 is fixed to the end plate and rotatably receives the rear wheel 24a which freely rotates about the axle 34 at all times. A second end plate 35 is secured to the other end of the support member 30 for rotatably receiving the axle 33.

The pedal drive 22 and support pipe 26 are welded at a front end to transverse axle support member 28 and extends rearwardly along the central axis 32. A brace pipe 38 is secured to the pipe 26 along section 26b. A pedal crank 40 is rotatably secured to the cantilevered end of the pipe 26. In FIG. 3, drive linkage 42 couples the pedal crank 40 to the rear wheel axle 33.

Figure 4A:
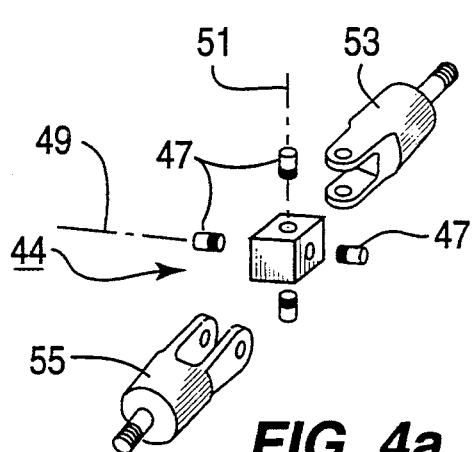
FIG. 4a is an exploded view of a universal joint used in the embodiment of FIG. 1.
Figure 4B:
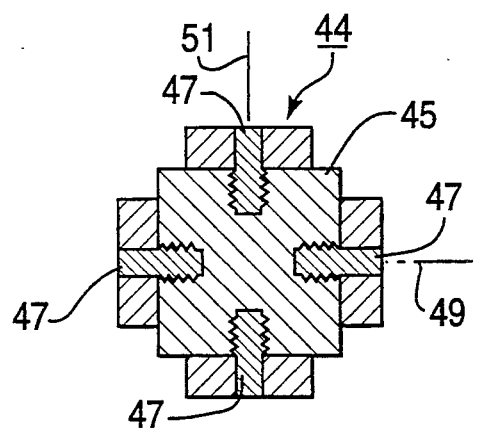

The drive linkage 42 comprises a plurality of universal joints 44 connecting a plurality of rigid linear metal drive rods 46, 48 and 50. These universal joints are shown in greater detail in FIGS. 4a and 4b. A universal joint 44 comprises a central pivot block 45 to which pivot pins 47 are threaded along two mutually normal intersecting axes 49 and 51. A yoke 53 is rotatably secured to opposing pins 47 for rotation about axis 51. A yoke 55 is rotatably secured to opposing pins 47 for rotation about axis 49. The yoke 53 is secured to one of the drive rods and the yoke 55 is secured to a second drive rod in the linkage 42.

An end of rod 46 is connected by the joint 44 to the pedal crank 40 and an end of rod 50 is connected to the axis 33 by another universal joint 44. The rod 48 is in the core of the pipe section 26b and the rod 50 is in the core of the pipe section 26c. The connecting universal joints 44 for these rods are also inside the respective pipe cores as shown.

The rear wheel 24 is fixed to the axle 33 so that rotation of the axle 33 rotates the rear wheel 24. This is the drive wheel. When the pedal crank 40 is rotated by actuation of foot pedals 52 secured thereto, the drive linkage 42 rotates and causes the axle 33 to rotate. A majority of the linkage 42 is thus contained within the frame 12 and a child operating the velocipede can not be injured by the rotating linkage within the frame. This also simplifies the structure appearance, with less damage possible to the drive mechanism by rough handling of the velocipede.

At the front of the velocipede 10, as shown in FIG. 2, a bearing 54 is secured at each end of the transverse support member 28. A right axle assembly 56 includes an axle 60 fixed to a steering crank 62. The steering crank 62 is pivotally secured to bearing 54 for rotation about a vertical king pin axis by king pin 56a. A left axle assembly 58 includes an axle 64 fixed to a steering crank 66. The steering crank 66 is pivotally secured to the bearing 54 at the other end of the support member 28. The king pin 58a rotatably secures the left axle assembly 58 to this bearing about a vertical axis. The right and left assemblies 56 and 58 are mirror images of each other.

The steering crank 62 has a crank arm 62a and steering wheel crank 66 has a crank arm 66a. A tie rod assembly 70 is pivotally secured to the crank arms 62a and 66a at each tie rod assembly end. A steering mechanism 72, which may include conventional cams, gears, levers and the like used for reciprocating a steering tie rod in a known way, is secured to the tie rod assembly 70 for displacing the assembly in the directions 74 to rotate the axles 60 and 64 about their respective king pins 56a and 58a.

A steering pipe 76 (FIG. 2) is welded at one end to transverse axle support member 28 at the junction with the pipe 36. The steering pipe 76 is braced to the pipe 36 by a pipe 78. A steering rod 80 in the steering pipe 76 is coupled at one end to the steering mechanism 72 and at the other end to a steering wheel 82. Rotation of the steering wheel 82 moves the tie rod assembly 70 in directions 74 rotating the axles 60 and 64 about their respective king pins for steering the vehicle.

A seat support frame 84 is welded to the pipe section 26c and to section 26b via a brace pipe 86. A seat 85 is mounted on the frame 84.

Figure 5:
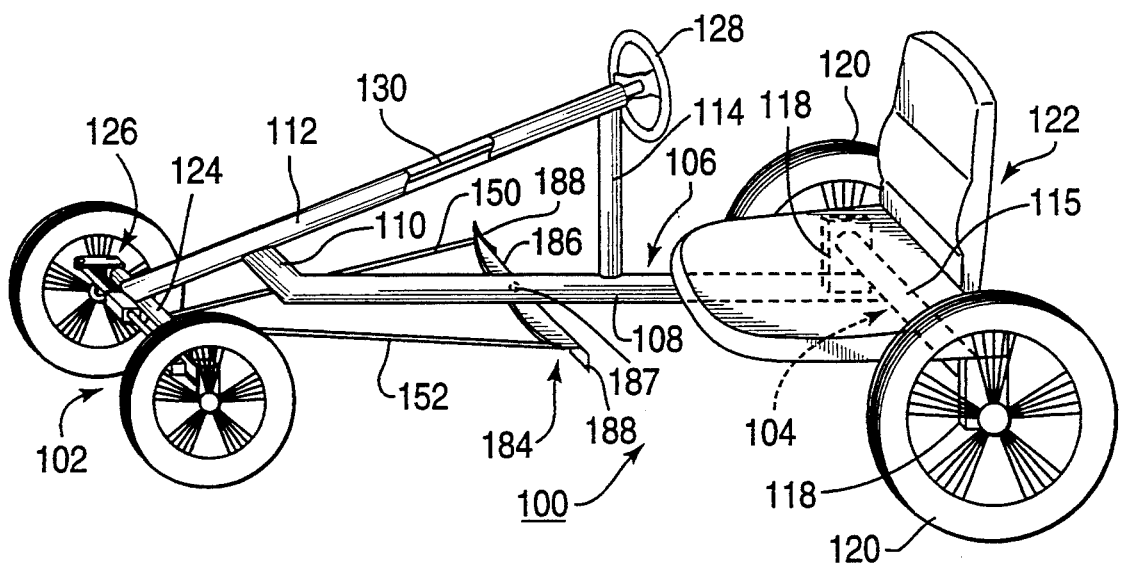
FIG. 5 is an isometric view of a velocipede according to a second embodiment of the present invention.
Figure 6:
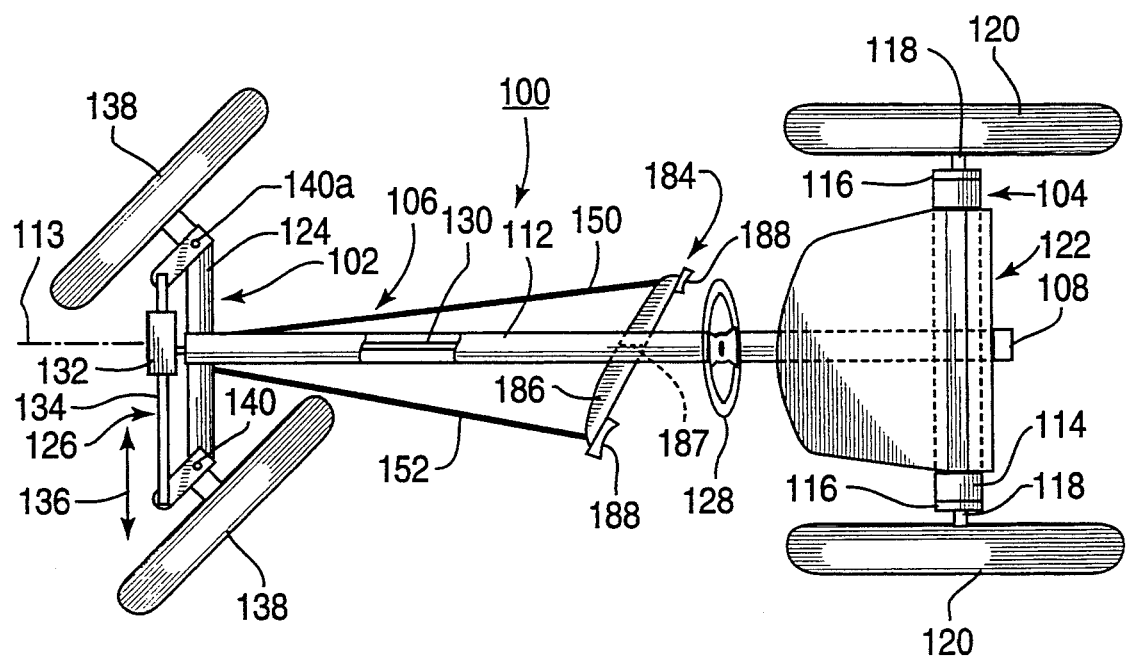
FIG. 6 is a plan view of the embodiment of FIG. 5 with the wheels turned.

An alternate embodiment of the velocipede of the invention is shown in FIGS. 5 and 6.

In FIGS. 5 and 6, velocipede 100 comprises a front axle assembly 102 and a rear axle assembly 104 connected by a frame 106. The frame 106 comprises an elongated pipe 108 with a bent front section 110. The pipe 108 is linear and lies on axis 113 for a major portion of the frame length. A steering support pipe 112 is welded to the end of the front section 110. An upstanding brace pipe 114 is welded to the pipes 112 and 108 at the cantilevered end of the pipe 112 and somewhat centrally of the pipe 108.

The rear axle assembly 104 comprises a transverse pipe member 115 having an end plate 116 at each end to which an axle 118 is fixed. A rear wheel 120 is rotatably secured to each axle 118. The end plate 116 is rectangular and depends from the member 115 to space the axles 118 for rotation about an axis beneath the level of the transverse member 115. A seat assembly 122 is secured to transverse member 115 and the pipe 108.

The front axle assembly 102 comprises a transverse pipe member 124 which is welded to an end of the steering pipe 112 adjacent to section 110. A steering assembly 126 is secured to the pipe member 124. A steering wheel 128 is secured to one end of a steering rod 130 mounted within the steering pipe 112. The other end of the steering rod 130 is connected to a steering mechanism 132 for reciprocating a tie rod assembly 134 in directions 136 to steer the front wheels 138 about king pin axes 140 and 140a.

Figure 7:
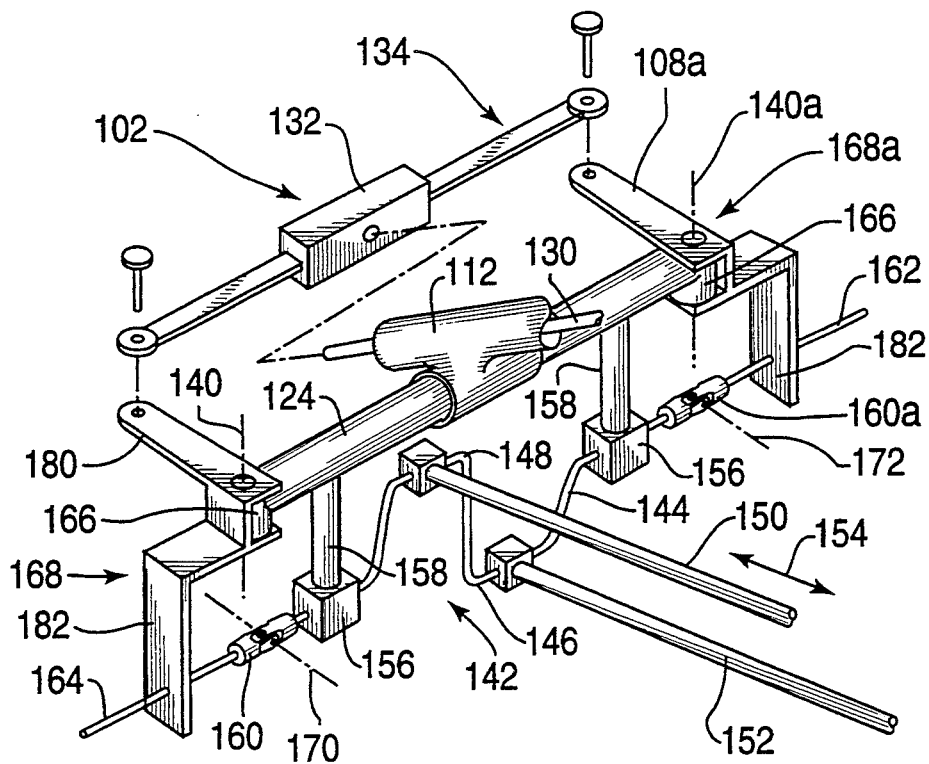
FIG. 7 is a partially exploded isometric view of the steering and axle arrangement of the embodiment of FIG. 5.
Figure 8:
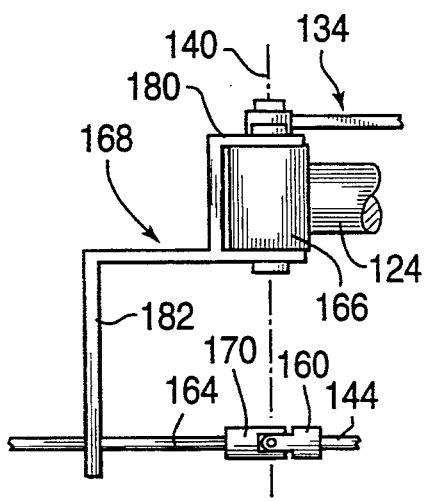
FIG. 8 is a side elevation view of a front wheel support assembly including a front wheel drive axle.

In FIGS. 7 and 8 is shown an axle assembly 142 comprises a bent crank shaft 144 having bends 146 and 148 extending in opposite directions from the crank shaft 144. A pair of reach arms 150 and 152 are pivotally secured to the respective bends 146 and 148. Alternating axial foot actuated forces in directions 154 causes the crank shaft 144 to rotate. Each end of the crank shaft 144 is rotatably secured in a journal 156 depending from the pipe member 124 by a corresponding stanchion 158. A universal joint 160 is secured to one end of the crank shaft 144 and a universal joint 160a is secured to the other end. These joints are identical and are similar to the universal joint 44 of FIGS. 4a and 4b. A right axle 162 is secured to joint 160a and a left axle 164 is secured to the other joint 160.

A king pin bearing 166 is secured to each end of the transverse pipe member 124. Mirror image cranks 168 and 168a are pivotally secured to a corresponding bearing 166 for rotation about a corresponding respective king pin axis 140 and 140a. The universal joint 160 for the left axle 164 rotates about a pivot point located at the intersection of axes 170 and 140. The universal joint 160a for the right axle 162 rotates about a pivot point located at the intersection of axes 172 and 140a. The cranks 168 and 168a necessarily rotate about axes 140 passing through the pivot points of the corresponding universal joint. Thus the axles 162 and 164 can be driven by the crank shaft 144 as the axles rotate about the steering axes 140a and 140 during steering.

The crank 168 has a crank arm 180 and the crank 168a has a crank arm 180a. The tie rod assembly 134 is pivotally secured at each end to a different crank arm 180 and 180a. The steering mechanism 132 is coupled to the tie rod assembly 134 as mentioned above. The crank 168 includes a depending axle support leg 182 which rotatably receives the axle 164. The crank 168a has a depending axle support leg 182a which rotatably receives axle 162.

As shown in FIGS. 5 and 6, foot pedal drive 184 includes a cross member crank 186 pivotally secured to the pipe 108 at pivot 187 for rotation about a vertical axis parallel to the brace pipe 114. Reach arm 150 is pivotally secured to one end of the crank 186 and reach arm 152 is pivotally secured to the other end of the crank 186. A foot pedal 188 is secured to each crank 186 end for foot operation of the crank 186. Alternating pressure on each foot pedal rotates the crank 186 and the crank 144 at the front axle assembly 102 via the reach arms 150 and 152. The axles are simultaneously rotated by this action. Also, simultaneously, the wheels may be steered as desired while the front axles are driven.

Throughout the description above, the various pipes are described as welded. It should be understood that other fastening means such as clamps, gusset plates and rivets or bolts may also be used. In addition while the frames are described as pipes, where applicable they may be solid rods circular, rectangular or otherwise in cross section. While the front wheels are shown to be smaller than the rear wheels, this is not critical.

What is important is that a single frame beam connects the front and rear axle assemblies to provide a light weight structure. While the single beam is described in sections, it should be understood that multiple sections of different orientations are intended to be included in the term single beam. Of course, the beam may be of but one section. The sections as shown may be linear or other shapes, e.g. curved. The entire single beam may divert from an axial direction or may lie entirely on a single axis.

While universal joints have been shown in this embodiment, ball joints may also be used. Further, other joint arrangements may be used to provide the desired pivot action. A rugged velocipede has been described which, in the embodiment of FIG. 1, is safe for very small children with a minimum of exposed moving parts.

The various pipes of the frame and axle assemblies may be 1 and ½ inch diameter steel pipe by way of example. The various embodiments are shown for purposes of illustration and not by way of limitation. The invention is to be limited only by the scope of the appended claims.

What is claimed is:

1. A velocipede comprising:
   a pair of front axles each for securing a front wheel thereto;
   at least one rear axle;
   a front transverse frame member having opposing ends;
   a rear transverse member;
   means for rotatably and pivotally securing each of the front axles to said front transverse frame member for rotation about respective normal first and second axes, each axle at a different opposing frame member end to permit steering the front wheels;
   a crank shaft rotatably secured to the front transverse frame member for rotation about a third axis intersecting said first and second axes;
   joint means for pivotally securing each front axle to said crank shaft about said first and second axes;
   a beam connecting the front and rear transverse frame members;
   an elongated pedal support member pivotally secured to and transverse said beam spaced from the front transverse member for rotation about a fourth axis;
   a steering member support secured to said front transverse member;
   a steering member rotatably secured to the steering member support for steering said front wheels; and
   a pair of drive rods each coupling a respective opposing end of said pedal support member to said crank shaft for rotating said crank shaft in response to pivoting of said pedal support member about said fourth axis.

2. The velocipede of claim 1 wherein said steering member support comprises a pipe having opposing ends connected at one end to said front transverse member and to said beam said distal front transverse frame member, said beam having opposing ends and including means for connecting one end to said steering member support pipe.

3. The velocipede of claim 1 wherein the pedal support member rotates in a horizontal plane about a vertical axis relative to the force of gravity when the velocipede is in use on a horizontal floor, said beam comprising a single elongated rigid member.

4. The velocipede of claim 1 including a plurality of king pin arms secured to said front transverse frame member each for rotation about a corresponding king pin axis, each said front axles being rotatably secured to a corresponding king pin arm, said joint means comprising first and second universal joints, each joint connecting an end of the crank shaft to a front axle for rotation of that axle about one of first and said second axis, said universal joints each rotating about a respective king pin axis.

5. The velocipede of claim 3 including a foot pedal at opposing extremities of said pedal support member.

6. A velocipede consisting essentially of:
   a pair of front axles each for securing a front wheel thereto;
   a front transverse frame member having opposing ends;
   a rear transverse member;
   means for rotatably and pivotally securing each of the front axles to said front transverse frame member for rotation about respective normal first and second axes, each axle at a different opposing frame member end to permit steering the front wheels;
   a crank shaft rotatably secured to the front transverse frame member for rotation about a third axis intersecting said first and second axes;
   joint means for pivotally securing each front axle to said crank shaft about said first and second axes;
   a beam connecting the front and rear transverse frame members;
   an elongated pedal support member pivotally secured to and transverse said beam spaced from the front transverse member for rotation about a fourth axis;
   a steering member support secured to said front transverse member;
   a steering member rotatably secured to the steering member support for steering said front wheels; and
   a pair of drive rods each coupling a respective opposing end of said pedal support member to said crank shaft for rotating said crank shaft in response to pivoting of said pedal support member about said fourth axis.

* * * * *